US008935481B2

(12) United States Patent
Maybee et al.

(10) Patent No.: US 8,935,481 B2
(45) Date of Patent: Jan. 13, 2015

(54) APPARATUS SYSTEM AND METHOD FOR PROVIDING RAW DATA IN A LEVEL-TWO CACHE (71) Applicant: Oracle International Corporation, Redwood City, CA (US)

(72) Inventors: Mark Maybee, Boulder, CO (US); Mark J. Musante, Westford, MA (US); Victor Latushkin, Superior, CO (US)

(73) Assignee: Oracle International Corporation, Redwood City, CA (US)

(*) Notice: Subject to any disclaimer, the term of this patent is extended or adjusted under 35 U.S.C. 154(b) by 265 days.

(21) Appl. No.: 13/656,108

(22) Filed: Oct. 19, 2012

(65) Prior Publication Data

US 2014/0115245 A1 Apr. 24, 2014

(51) Int. Cl.
*G06F 12/12* (2006.01)
(52) U.S. Cl.
CPC ........ *G06F 12/126* (2013.01); *G06F 2212/402* (2013.01); *G06F 2212/401* (2013.01)
USPC .......................................... 711/133; 713/164
(58) Field of Classification Search
USPC .......................................... 711/133; 713/164
See application file for complete search history.

(56) References Cited

U.S. PATENT DOCUMENTS

| 2005/0268044 | A1* | 12/2005 | Arcas ............................ 711/133 |
| 2006/0044315 | A1* | 3/2006 | Yamamoto .................... 345/543 |
| 2011/0087840 | A1* | 4/2011 | Glasco et al. .................. 711/118 |
| 2013/0061058 | A1* | 3/2013 | Boivie et al. .................. 713/189 |
| 2013/0332652 | A1* | 12/2013 | Hayashi ........................ 711/103 |

* cited by examiner

*Primary Examiner* — Jared Rutz
(74) *Attorney, Agent, or Firm* — Polsinelli PC (57) ABSTRACT

Aspects of the present disclosure disclose systems and methods for managing a level-two persistent cache. In various aspects, a solid-state drive is employed as a level-two cache to expand the capacity of existing caches. Any data stored in the level-two cache may be stored in a particular version or format of data known as "raw" data, in contrast to storing the data in a "cooked" version, as is typically stored in a level-one cache.

20 Claims, 7 Drawing Sheets

| | KEY FIELD | DATA FIELD |
|---|---|---|
| 1 | 36 | CEL A |
| 2 | 44 | CEL B |
| 3 | 57 | CEL C<br>R-CEL C |
| 4 | 67 | CEL D<br>R-CEL D |
| 5 | 72 | ... |

Rows 1–5 grouped as 302B. Labels: 308 → CEL C, 310 → R-CEL C, 312 → CEL D, 314 → R-CEL D.

APPARATUS SYSTEM AND METHOD FOR PROVIDING RAW DATA IN A LEVEL-TWO CACHE

TECHNICAL FIELD

Aspects of the present disclosure relate to computing systems, and in particular, systems and methods for managing memory.

BACKGROUND

In an attempt to mitigate the impact of the growing gap between CPU performance and storage performance, many computer architectures implement hierarchical memory structures that place one or more higher speed memory caches between the CPU and the slower, disc storage or other from of storage. Generally speaking, memory caches are designed to contain copies of data that is also contained in slower disc storage. However, since cache memory is typically more expensive than disc storage, cache memories are typically limited in size. As such, various caching schemes are used to store frequently used data, or recently used data, or some other subset of all data. To manage the cache after it has become full, existing data is evicted when new data arrives. Caches can only improve performance if data blocks which have already been loaded in the cache are reused before being replaced. Thus, the management of cache capacity and data use is critical.

It is with these concepts in mind, among others, that aspects of the present disclosure were conceived.

SUMMARY

One aspect of the present disclosure involves a system for providing raw data. The System includes at least one processor to store, for each data block of a plurality of data blocks, a raw version of the data block and a cooked version of the data block in a level-one cache of a file system. The processor is further configured to determine whether a first data block of the plurality of data blocks is a candidate for a level-two cache. The processor is configured to store the raw version of the first data block into the level-two cache of the file system when the first data block is the candidate for the level-two cache.

Aspects of the present disclosure include methods for providing raw data comprising. The method includes storing, for each data block of a plurality of data blocks, a raw version of the data block and a cooked version of the data block in a level-one cache of a file system. The method also includes determining whether a first data block of the plurality of data blocks is a candidate for a level-two cache. The method includes storing the raw version of the first data block into the level-two cache of the file system when the first data block is the candidate for the level-two cache.

Aspects of the present disclosure include a non-transitory computer readable medium encoded with instructions for providing raw data to a level-two cache executable by a processor. The instructions include storing, for each data block of a plurality of data blocks, a raw version of the data block and a cooked version of the data block in a level-one cache of a file system. The instructions further include determining whether a first data block of the plurality of data blocks is a candidate for a level-two cache. The instructions include storing the raw version of the first data block into the level-two cache of the file system when the first data block is the candidate for the level-two cache.

BRIEF DESCRIPTION OF THE FIGURES

Aspects of the present disclosure may be better understood and its numerous objects, features, and advantages made apparent to those skilled in the art by referencing the accompanying drawings. It should be understood that these drawings depict only typical embodiments of the present disclosure and, therefore, are not to be considered limiting in scope.

DETAILED DESCRIPTION

Aspects of the present disclosure describe systems and methods for providing raw data in a persistent level-two ("L2") cache, which operates in conjunction with a level one ("L1") cache to provide caching functions for a storage pool involving one or more hard disk drives or other forms of storage. In various aspects, a persistent solid-state drive ("SSD") may be employed as a L2 cache to expand the capacity of existing L1 caches that may be employing direct random access memory ("DRAM") or other relatively faster memory. In particular, any data that is scheduled to be evicted or otherwise removed from the L1 cache may be stored in the L2 cache in a manner that allows the data to be quickly accessed in the L2 cache. For example, the L2 cache may store data that is not requested frequently enough to justify maintaining the data in the L1 cache, but is accessed enough that maintaining a copy of the data in the L2 cache may be beneficial to overall cache performance, and system performance when compared to accessing the data from longer term storage such as hard discs.

Aspects of the present disclosure ensure that a particular version or format of data known as "raw" data will be stored in the L2 cache, in contrast to storing data in a "cooked" version in the L2 cache, as is typically stored in the L1 cache. In various aspects, both a raw version and a cooked version of any piece of data will be stored in the L1 cache. Subsequently, if data is copied from the L1 cache to the L2 cache, only the raw version of the data will be copied and stored. By only allowing raw data to be stored in the L2 cache, the integrity of various security standards typically required by persistent storage mediums (e.g. solid state drives) mechanisms may be maintained. Additionally, by storing raw data in the L2 cache checksum computations that are specific to raw data and typically used for data stored in main memory and/or long term persistent disc storage may be extended to the L2 cache.

A cache represents a mechanism used within various computing devices and/or resources to reduce the average wait time to access main memory, disk storage, etc. In particular, the cache represents a smaller, faster memory capable of storing copies of data from frequently used or otherwise important main memory locations so that future requests for the data stored in the cache may be accessed faster. Various schemes for managing caches exist, some of which include most recently used (MRU), least recently used (LRU), and numerous others. Regardless, a cache may be used to increase the speed at which data may be accessed by reducing the number of instances in which a main disk storage or main memory is accessed.

Generally, a cache is made up of a pool of entries. An "entry" includes a specific piece of data and a reference or tag that identifies the data. The data is stored in the cache memory and a reference identifying the data is maintained in an ordered list that may be used to quickly access the data stored within the cache. The L1 cache maintains knowledge of the data stored in the L1 cache itself, as well as the data stored in the L2 cache.

Data stored within the L1 cache may be stored in a different format than the data is stored in a main memory or disk storage. In particular, as data passed to a main memory or disk storage, the data may be transformed, such as by being compressed and/or encrypted. Compression refers to encoding the data using fewer bits than were used to encode the data in its original representation. Encryption refers to transforming the data using an algorithm to make it unreadable to anyone except those possessing knowledge, such as a key. Both compression and encryption are transformations that modify the actual content and/or format of the data. In contrast, when data is stored in the L1 cache, the data is typically stored in an unencrypted clear text format. The data is stored in such a format in the L1 cache so that any request for the data can be processes and performed quickly; the data would not have to be uncompressed or decrypted, both of which would increase the latency of the L1 cache. Thus, an encrypted and/or compressed version of the data may reside in the main memory while a decrypted uncompressed version may reside in the L1 cache. Although, as mentioned, raw data may also be stored in the L1 cache.

Data that is compressed and/or encrypted is referred to as "raw" data, and as introduced is typically stored in main memory. Storing cooked data in an L2 cache may present many challenges in conventional caching systems. For example, if the L2 cache is implemented using a persistent storage medium, such as an SSD, storing the cooked data within the L2 cache may result in a violation of security standards. In particular, any data stored in a persistent storage medium will remain stored until the data is physically removed. Thus, any users, applications, processes, etc., capable of gaining access to the persistent storage medium will have access to data stored in an unencrypted clear format data unless it has been removed. Allowing cooked data to remain permanently stored in a persistent storage medium increases the likelihood that the data may be accessed by unintended users. For example, assume a webmail client application would like to improve its performance by storing user emails in a persistent storage medium. Doing so, allows the webmail client to only download new email information, effectively speeding up its startup procedures and/or various other operations during execution. When the webmail client is terminated, the email data will still be stored in the persistent storage medium because the web client did not delete the data when terminated, allowing anyone who is able to gain access to the persistent storage to access the email data, provided it was in a readable form.

Additionally, any checksum mechanisms used to validate and/or verify that blocks of data stored in a raw version or format were not altered or corrupted, as any checksums corresponding to raw data stored in main memory may not be used to validate cooked data stored in the L1 cache and/or the L2 cache (and vice versa). Finally, conventional caching systems are incapable of encrypting and/or decrypting data at the cache level because the security keys used in the encryption or decryption process are communicated through the various I/O requests passed between, for example, a file system and an operating system; the encryption keys are not kept along with the data and/or within the various caches. Thus, while the data may be encrypted/decrypted and/or compressed/uncompressed when being written or read to and from main memory, at the cache level, the data may not be encrypted/decrypted and/or compressed/uncompressed because the various keys used in such processes are unavailable. The management of raw and/or cooked data within the cache, and in particular the L2 cache, may resolve such issues.

Figure 1:
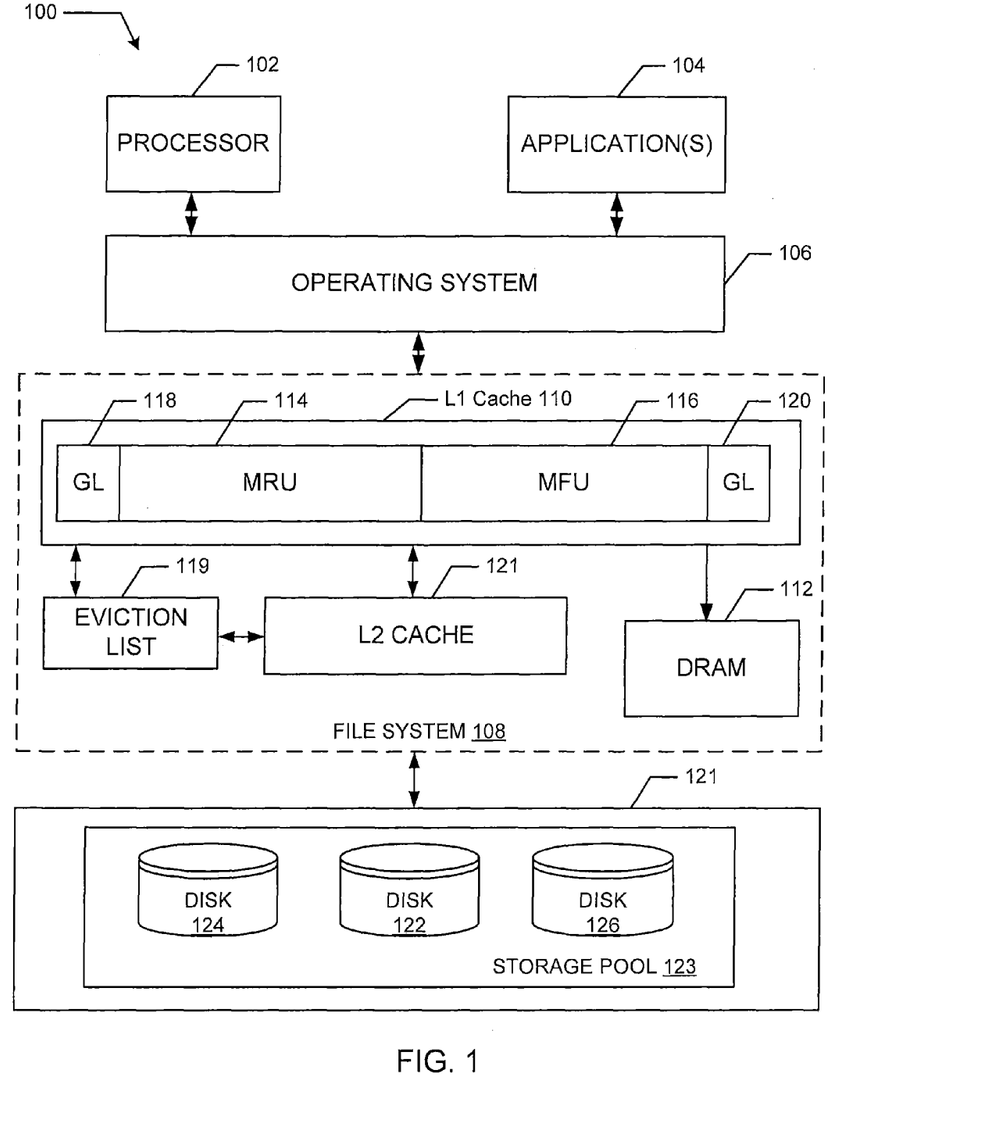
FIG. 1 is an example computing environment for providing raw data in a level-two cache in accordance with one aspect of the present disclosure.

FIG. 1 illustrates an example computing architecture 100 for providing a persistent L2 cache. The computing environment 100 may include at least one processor 102, which may be capable of processing various instructions of a computer program, such as application(s) 104, by performing basic arithmetical, logical, and/or input/output operations, etc. The processor 102 may be included in various devices such as a personal computer, work station, server, mobile device, mobile phone, tablet device, processor, and/or other processing device capable of implementing and/or executing instructions, processes, software, applications, etc.

The processor 102 may interface with an operating system 106, which may include functionality to interact with a file system 108. For example, the operating system 106 may interface with the file system 108 via a system call interface (not shown). The operating system 106 may provide operations for users to access files within the file system 108, such as read, write, open, close, etc. The file system 108 may be an object-based file system in which both data and metadata are stored as objects within the file system. In particular, the file system 108 may include functionality to store both data and corresponding metadata in a storage device, such as disk 122. Accordingly, the various operations provided by the operating system 106 correspond to operations on objects. For example, a request to perform a particular operation (i.e., a transaction) is forwarded from the operating system 106, using the system call interface, to the file system 108. In response, the file system 108 may translate the request to perform an operation on an object directly into a request to perform a read or write operation (i.e., an I/O request) at a physical location within the disk 122.

In one particular embodiment, the file system 108 may be a ZFS file system. ZFS represents a combined file system and logical volume manager designed by Oracle®. The features of ZFS include data integrity verification against data corruption modes, support for high storage capacities, integration of the concepts of file system and volume management, snapshots and copy-on-write clones, continuous integrity checking and automatic repair, RAID-Z and native NFSv4 ACLs, and the like. ZFS stores and/or otherwise organizes data into objects known as data "blocks."

Figure 2:
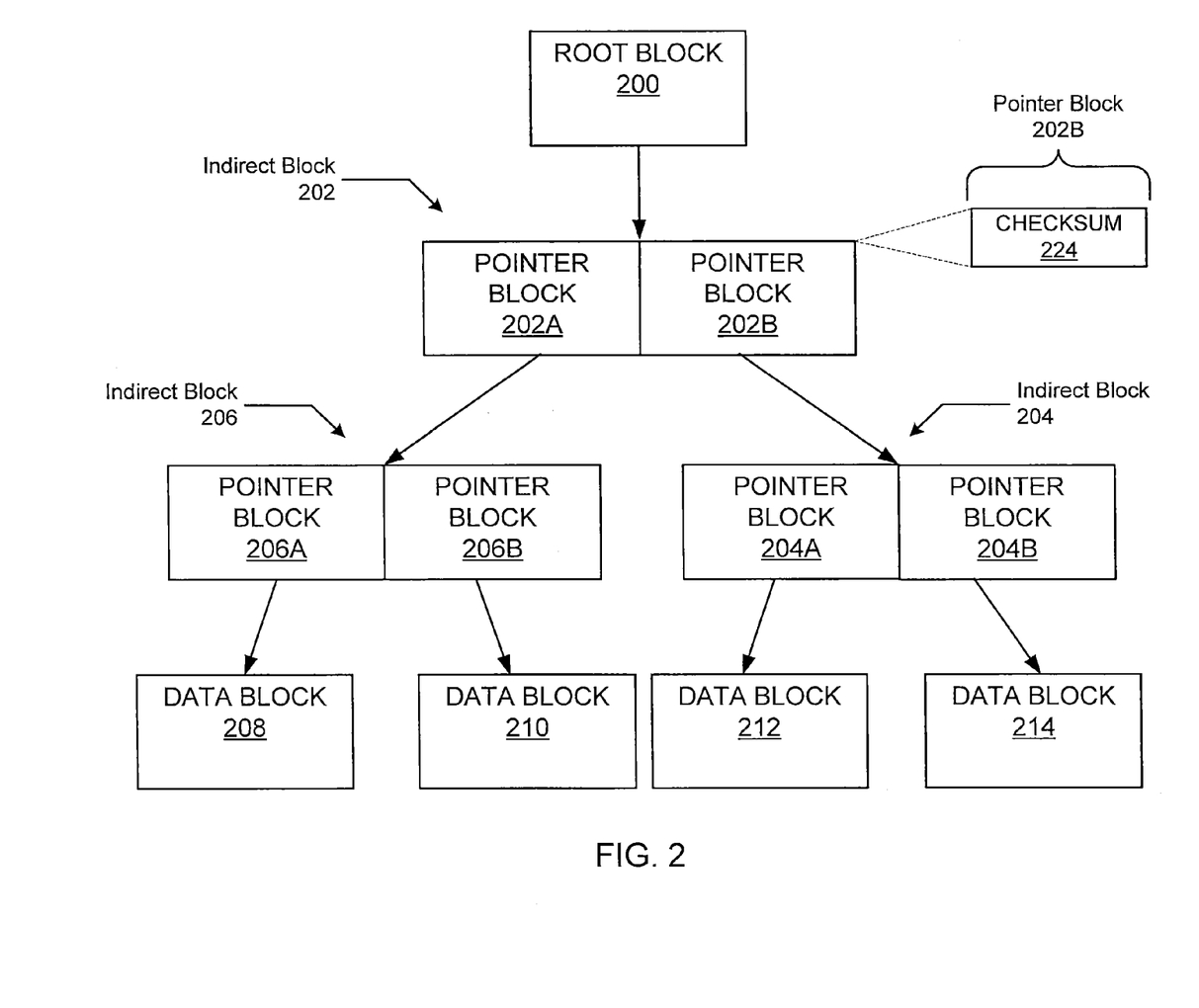
FIG. 2 is a block diagram illustrating data blocks of a file system in accordance with one aspect of the present disclosure.

FIG. 2 is a diagram illustrating a hierarchical data configuration (hereinafter referred to as a "tree") for storing data blocks within a ZFS file system. The tree includes a root or uber block 200, one or more levels of indirect blocks (202, 204, 206), and one or more data blocks (208, 210, 212, 214). The location of the root block 200 is in a particular location within the disk 122. Additionally, the root block 200 may point to subsequent indirect blocks (202, 204, and 206), which may be arrays of block pointers (202A, 202B, 204A, 204B, 206A, 206B) that, directly or indirectly, reference data blocks (208, 210, 212, 214). The data blocks (208, 210, 212,

214) contain actual data of files. Several layers of indirect blocks may exist between the root block 200 and the data blocks (208, 210, 212, 214).

The root block 200 and each block pointer (202A, 202B, etc.) may include a checksum 224, as illustrated in the expanded diagram of block pointer 202B, which may be for example, a 256-bit checksum. A checksum represents a datum or value computed for an arbitrary block of data for the purpose of detecting accidental errors that may have been introduced during transmission or storage of the data. The integrity of the data can be checked at any time by re-calculating the checksum and comparing it with the stored value. If the checksums match, the data was almost certainly not altered or corrupted. Importantly, the checksum may be used with the same format of data. Thus, if the checksum is initially calculated for a data block in a raw version or format, the checksum must be re-calculated using the same raw version or format of the data block. The data blocks (208, 210, 212, and 214) do not include such information; rather, data blocks (208, 210, 212, and 214) contain the actual data of files within the ZFS file system.

Referring again to FIG. 1, the file system 108 may interface or otherwise include an L1 cache 110 capable of storing one or more data objects (e.g., blocks) for frequent and fast data access. The L1 cache 110 may be any type of cache and may use various forms of relatively fast memory. In one particular embodiment, the cache may be an Adaptive Replacement Cache ("ARC") implemented in and/or in conjunction with dynamic random access memory ("DRAM") 112. DRAM 112 may be any type or format and size of dynamic random access memory.

In an ARC implementation, the entries entered into the L1 cache 110 may be maintained or managed in an ordered cache list and sorted based on the time of most recent access. Accordingly, new entries into the L1 cache 110 are added at the top of the cache list, after the last entry on the list has been evicted. The new entry added at the top of the list pushes all of the other entries down. Each slot in the ordered cache list identifies specific physical data stored in DRAM 112. For example, each slot in the ordered cache list may be a reference pointing to a specific address and/or location in the DRAM 112.

The ordered cache list of the L1 cache 110 may be a limited size and may be divided into two variable lists, such as a "Most Recently Used" ("MRU") list 114 and a "Most Frequently Used" ("MFU") list 116, in one example. Thus, the MRU 114 and MFU 116 combined constitute a listing of all the data stored in the L1 cache, and each list (MRU and MFU) may be dynamically adjustable in size such that each list may increase or decrease in relation to the size of the other list. For example, assume the size of the L1 cache 110 was fixed at 64 KB, the MFU 116 being 32 KB and the MRU 114 being 32 KB. If the size of the MRU 114 increased 12 KB to 44 KB, the MFU 116 would be decreased proportionally in relation to the MRU 114, or by 12 KB to 20 KB; however, the fixed size of the overall L1 cache 110 would not change.

The MRU 114 contains the new entries added into the cache and behaves like the ordered list described above. Accordingly, any entry added to the MRU 114 is added at the top of the list, after the last entry of the MRU 114 has been evicted, if the MRU is full. The MFU 116 contains resource entries added to the cache that have already been requested and/or accessed at least one time before the current entry, or entries that are requested/accessed frequently. For example, assume the MFU 116 contained a reference "36" pointing to data block "A". If another request for data block "A" was transmitted from the operating system 106 to the L1 cache 110 of the file system 108, the L1 cache 110 would remove reference '36" from the MRU 114 and add it to the MFU 116. The MFU 116, like the MRU 114, behaves like an ordered cache list described above. Thus, referring to the example above, when reference "36' is added to the MFU 116, the last entry of the MFU 116 is evicted if the MFU is full. Entries entered into the MFU 116 may stay there continuously as long they are referenced again before being evicted. Thus, in the example above, reference "36" would stay in the MFU as long as reference "36" was referenced again before being evicted. If reference "36" were referenced again, it would be added to the top or beginning of the MFU list.

Both the MRU 114 and the MFU 116 may be extended with ghost lists, ("GL") (118 and 120), which are attached to the logical end of the MRU 114 and the MFU 116 respectively. The GLs are used to keep track of recently evicted cache entries from the MRU 114 and the MFU 116 lists. Thus, the MRU GL 118 tracks or records the evicted entries from the MRU 114 and MFU GL 120 tracks or records the cache entries evicted from the MFU 116. The GLs only include metadata corresponding to entries in the MRU and/or MFU and not the data itself. Rather, cache hits in the GLs 118 and 120 may be used to adapt to recent changes in the MRU 114 and/or MFU 116 usage loads. In particular, if entries are continuously being added to the MRU GL 118, it may be an indication that the size of the MRU 114 is too small and should be increased, effectively decreasing the size of the MFU 116. Alternatively, if the MFU GL 120 is continuously receiving additional entries, it may be an indication that the size of the MFU 116 is too small and should be increased, effectively decreasing the size of the MRU 114. In the way described, hits in the ghost lists may be used to dynamically adjust the size of the MRU or the MFU up to some maximum size that is constrained by the overall size of the L1 cache.

The evicted entries from the L1 cache 110 may also be tracked in an eviction list 119 that may behave like an ordered list. Specifically, when it is determined that a data block is no longer required in the L1 cache 110, the data block is referenced in the eviction list 119 for eviction. For example, the ZFS file system may execute a thread or process that determines whether a particular block of data stored in L1 cache 110 should be evicted, and if so, includes a reference to the block of data in the eviction list 119. Thus, the eviction list 119 contains data currently stored in the L1 cache 110 that may be a candidate for eviction.

The processor 102 and/or the file system 108 may implement a hash table to identify and find actual data in the L1 cache 110 and/or an L2 cache 121 (the L2 cache will be described in detail below) based on the various entries added to the MRU 114 and/or the MFU 116 and the GLs 118 and 120. Stated differently, the hash entries identify where an actual copy of a specific block of data may be stored in the L1 or L2 cache. A hash table is a type of data structure that uses a hash function to map identifying values, known as keys, to their associated values. Typically, a hash table is implemented as an array. Thus, the hash function is used to transform the key into the index (the hash) of an array element (the slot or bucket) where the corresponding value is to be sought. In the context of the L1 cache, the hash table includes values which identify or point to a particular location within the MRU 114 and/or MFU 116. At that particular location, a reference that identifies actual data stored in DRAM 112 and/or the L2 cache 121 is maintained. Alternatively, the hash entry may identify a specific location in the GLs 118 or 120 that identifying a recently evicted cache entry.

Figure 3A:
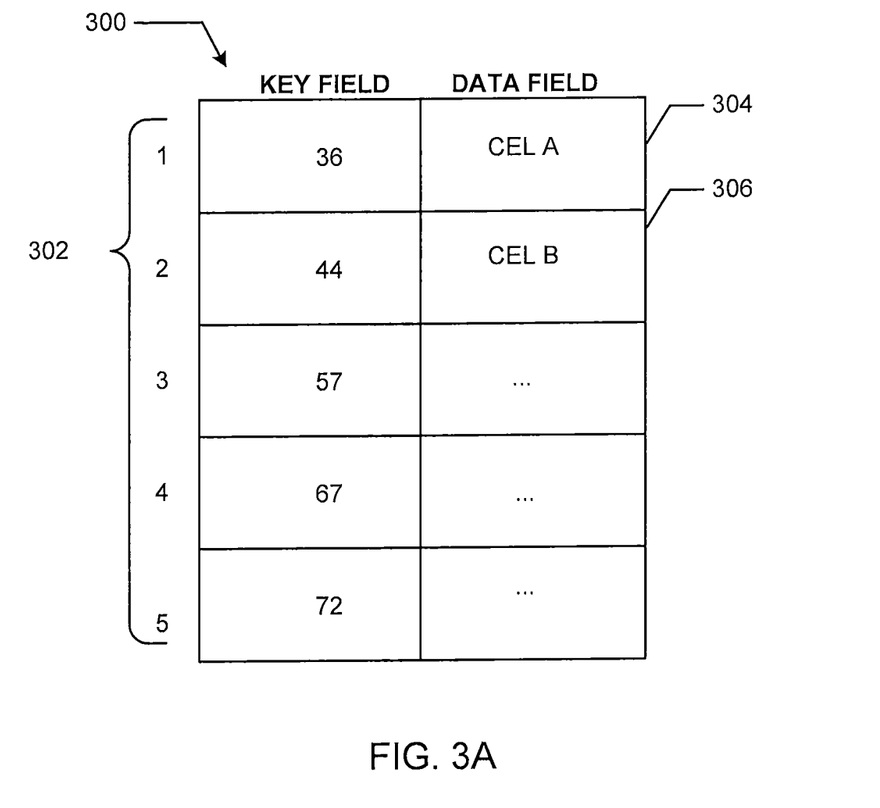
FIGS. 3A-3B are block diagrams illustrating a hash table in accordance with one aspect of the present disclosure.

FIG. 3A is an example illustration of a hash table 300 including multiple records 302. As illustrated, each record 302 (e.g., 1, 2, 3, 4, and 5) in the hash table 300 includes a key field and an associated data field. The hash table 300 may be used to indicate whether a block of data has been stored in the L1 cache 110, the L2 cache 121, etc. For example, referring to the data block "A" example, reference "36" may be looked up in the hash table 300 indicating that a reference to block "a" was kept at a particular cache entry location ("CEL") A 204 within the MRU 114 or the MFU 116. As another example, reference 44 may be looked up in the hash table 300 indicating that a reference to a block of data "B" was kept in was kept at a particular CEL B 204 within the MRU 114 or the MFU 116.

Figure 3B:
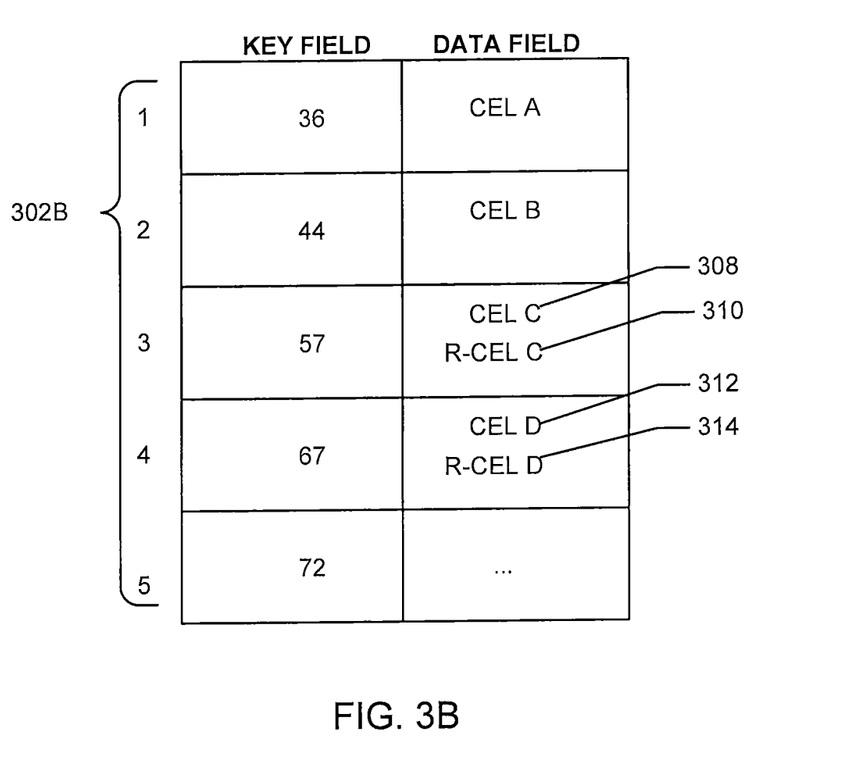

As illustrated in FIG. 3B, the various records within the hash table 300 may be updated or annotated to indicate that both a raw version of the data and a cooked version of the data has been stored in the L1 cache 110. For example, reference 57 may be looked up in the hash table 300 indicating that a cooked version of a block of data was kept at a particular CEL C 208 within the L1 cache 110 (e.g. in the MRU 114, MFU 116, GL 118 or GL 120), and further, that the block of data is also being kept in a raw version format in the L1 cache 110 at a particular CEL-R D 210. Additionally, the entry corresponding to reference 67 may be looked up in the hash table 200 indicating that a cooked version of a block of data was kept at a particular CEL D 212 within the L1 cache 110 (e.g. in the MRU 114, MFU 116, GL 118 or GL 120) and further, that a raw version of the block of data is also being kept at a particular CEL-R D 214 in the L1 cache 110.

Figure 4:
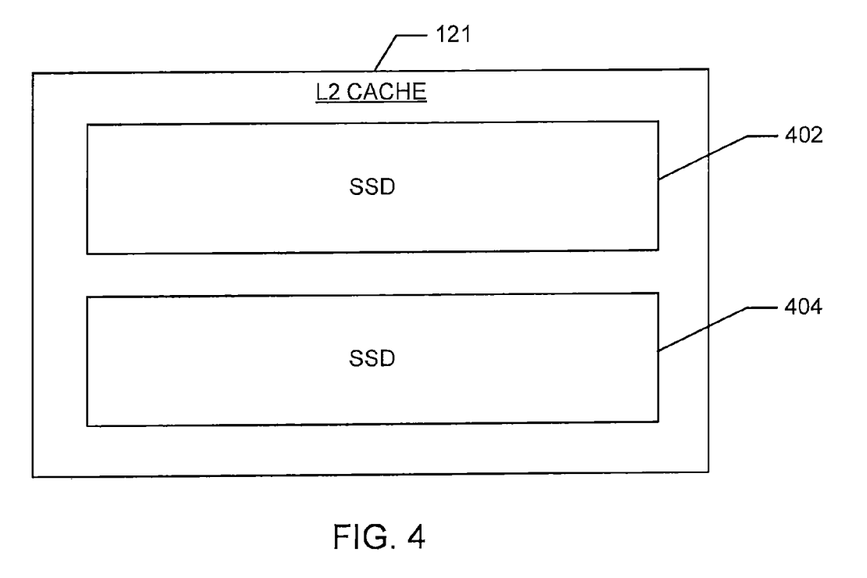
FIG. 4 is an illustration of a level-two cache in accordance with one aspect of the present disclosure.

Referring again to FIG. 1, the L1 cache 110 may be in operable communication with the L2 cache 121. The L2 cache 121 represents a secondary cache that obtains data evicted or otherwise removed from the L1 cache 110, although it is not necessary that the L2 cache only have data evicted or otherwise removed from L1. FIG. 4 illustrates one possible example of the L2 cache in the form of one or more solid-state drives (402 and 404). A solid-state drive ("SSD") represents a type of storage device that uses semiconductor technology (e.g., integrated circuit assemblies) as memory to store data persistently. Typically, SSDs use an I/O interface developed for conventional disk storages, such as hard disk drives. Thus, SSDs can be easily integrated with existing computing environments, existing applications, file systems, or the like. In some instances, SSD drives function in accordance with SCSI protocols.

Each SSD may be any size. For example, each SSD may be 1.5 TBs (terabytes), resulting in an L2 cache capable of storing 3 TBs of data evicted from the L1 cache 110. Referring to the example block "A" above, when block "A" is added to the MFU 116, data must be evicted from the MFU 116. A reference to the data evicted from the MFU 116 is obtained by the GL 120, and the evicted data may be added to or otherwise stored in one of the SSDs 402 or 404 of the L2 cache 121. For example, if a 1 MB (megabyte) data block "B1" were evicted from the MFU 116, as a result of block "A" being added to the MFU 116, the GL 120 will store a reference corresponding to the evicted "B1". Additionally, the L2 cache 121 may received and store data block "B1" and may receive and store metadata and/or a reference to corresponding to block "B1". The L2 cache 121 may access and/or deliver data at a rate slower than the L1 cache 110, but faster than accessing data from the disk 122. Referring to block "B1", the L1 cache 110 may require 1 millisecond to access and/or deliver "B1" and the L2 cache 121 may require 5 milliseconds to access and/or deliver "B1", both of which are faster than accessing "B1" from the disk 122, which may take 50 milliseconds. Thus, in general, the L1 cache 110 may have a lower latency than the L2 cache 121, and the L2 cache 121 may have a lower latency than the disk 122.

The L2 cache 121 may execute a thread and/or process that periodically scans the L1 cache to identify data blocks that may be a candidate for copying from the L1 cache 110 to the L2 cache 121. The data blocks may be selected from the L1 cache 110 added to the L2 MRU list 207 of the L2 cache 121. In one particular embodiment, the L2 cache 121 may analyze a data block to determine whether the data block is a good candidate for copying from the L1 cache 110 to the L2 cache 121. For example, the L2 cache 121 may determine if the data block is pre-fetch data. If so, the L2 cache may identify the data block as not being a candidate for copying from the L1 cache 110 to the L2 cache 121. Alternatively, the L2 cache 121 may determine if the data block is for streaming purposes. Streaming refers to the constant delivery portions of a data file to an end-user. Data blocks that are accessed for streaming purposes are not good candidates for copying to the L2 cache 121, because data that is streamed is more effectively retrieved from higher latency storage. The L2 cache may scan the eviction list of the L1 cache 110 to identify potential candidates. Any data block located in the eviction list of the L1 cache 110 may be considered a good candidate for copying to the L2 cache 121. Other analyses may be performed to determine whether a given data block within the L1 cache 110 is a good candidate for copying to the L2 cache 121. In yet another example, if the file system 108 is in read only mode, such as when a data pool is being imported, no writes should be sent to any devices associated with the pool, including the L2 cache 121.

Referring now to FIGS. 1-5, in one particular embodiment, the processing device 102 may launch, run, execute, interpret, or otherwise perform various logical instructions, of the operating system 106, the file system 108, the cache 110, and/or the L2 cache 121 such as process 500, which depicts an example method for providing cooked data in an L2 cache. Process 500 begins with receiving a request for a data block stored in a main storage (operation 502). For example, the file system 108 may receive a read request from operating system 106 to read data from a physical location within the disk(s) 122.

Figure 5:
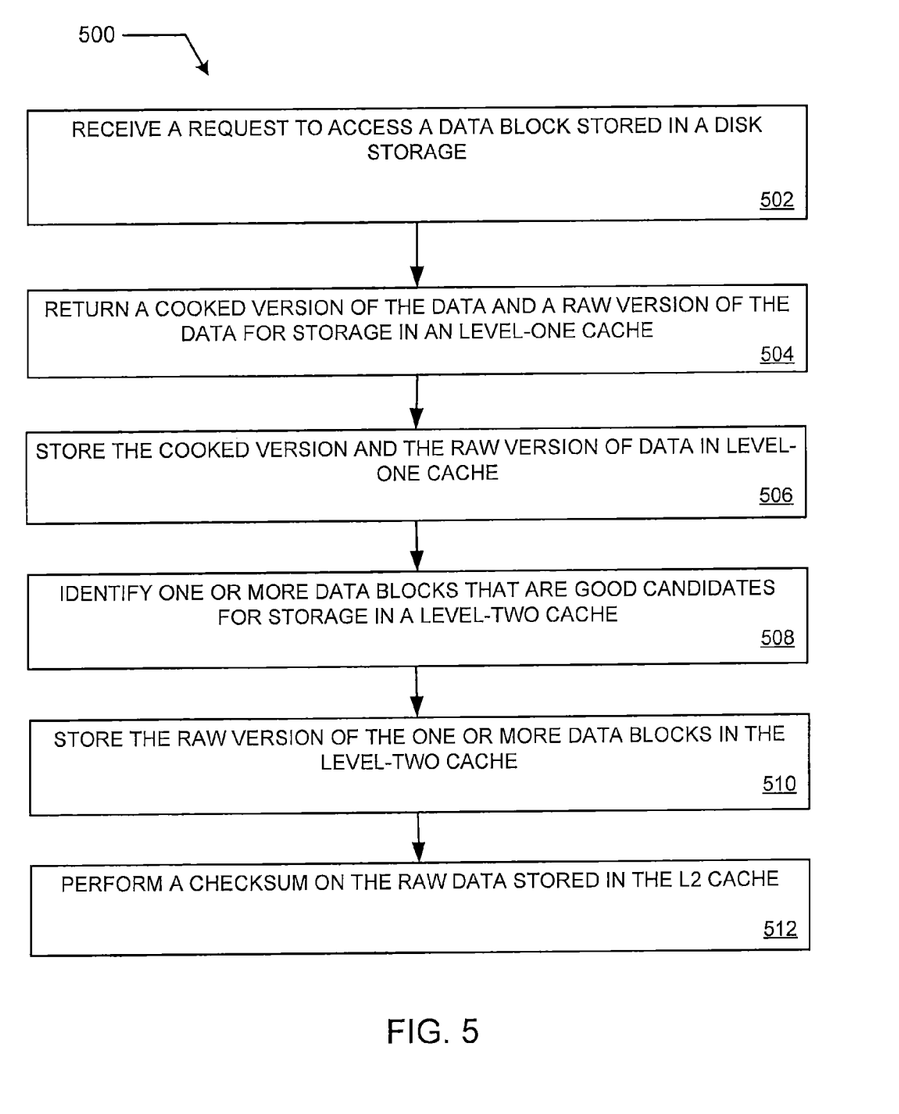
FIG. 5 is an example process for providing raw data to a level-two cache in accordance with one aspect of the present disclosure.

In response to the request, both a cooked version and a raw version of the data block may be retrieved and returned for storage in the L1 cache (operation 504). The cooked version of the data may be generated in the I/O path between the disc and the L1 cache, and the raw version of the data may be received from a disk within the storage pool 123, such as disk 122. Additionally, a reference, such as a pointer, to both the raw version of the data block and the cooked version of the data block may be added in the MRU 114 of the cache 110 maintained. Both the cooked version of the data and the raw version of the data may be stored in the L1 cache (operation 506). The cooked and raw version of the data block may be stored in the DRAM 112 of the L1 cache 110. Additionally, an entry corresponding to the data block may be entered into a hash table, such as hash table 300, indicating that both a cooked version of the data and a raw version of the data has been stored in the L1 cache 110, and in particular, the DRAM 112.

For example, if a request to read data block "Y1" were received and processed, a raw version of data block "Y1" may be retrieved from disk 122 and a cooked version of the data corresponding to data block "Y1" may be generated in the I/O path, with both versions of the data being returned to the L1 cache 110. An entry corresponding to data block "Y1" may be entered into a hash table, such as hash table 300, indicating that both a cooked version of the data and a raw version of the data has been stored in the L1 cache 110, and in particular, the DRAM 112. A pointer to the raw version of data block "Y1" may be maintained.

Once the cooked version of the requested data and the raw version of the requested data have been stored in the L1 cache, the L2 cache may identify one or more data blocks for storage in the L2 cache (operation 508). In particular, the L2 cache 121 may scan portions of the L1 cache 110 to identify data block candidates for L2 cache storage, such as a data block referenced within the eviction list 119 of the L1 cache 110. Subsequently, an entry in a hash table of the L1 cache 110 corresponding to the identified data block may be analyzed to determine whether a raw version of data corresponding to the data block exists. If so, the raw version of the data block is stored in the L2 cache 121 (operation 510).

For example, the L2 cache 121 may scan the L1 110 eviction list and identify a data block "G", as being a candidate for storage in the SSD 402 or 404. In order to store data block "G" in the L2 cache 121 (e.g. in SSD 402 or 404), a hash table entry corresponding to data block "G" of the L1 cache 110 may be analyzed to obtain pointer to the raw version of data block "G" in the DRAM 112 of the L1 cache 110. Subsequently, the raw version of data block "G" is returned and stored in the SSD 402 of the L2 cache 121.

Optionally, one or more checksums may be performed (operation 512). Since a raw version of the data is now stored in the L2 cache 121, the file system 108 may perform any checksums corresponding to the raw data that was originally stored in the storage pool 123, such as in disk 122. When cooked data was stored in the L2 cache 121, no checksums could be performed, because the checksums offered by the file system 108 only applied to the raw data.

Figure 6:
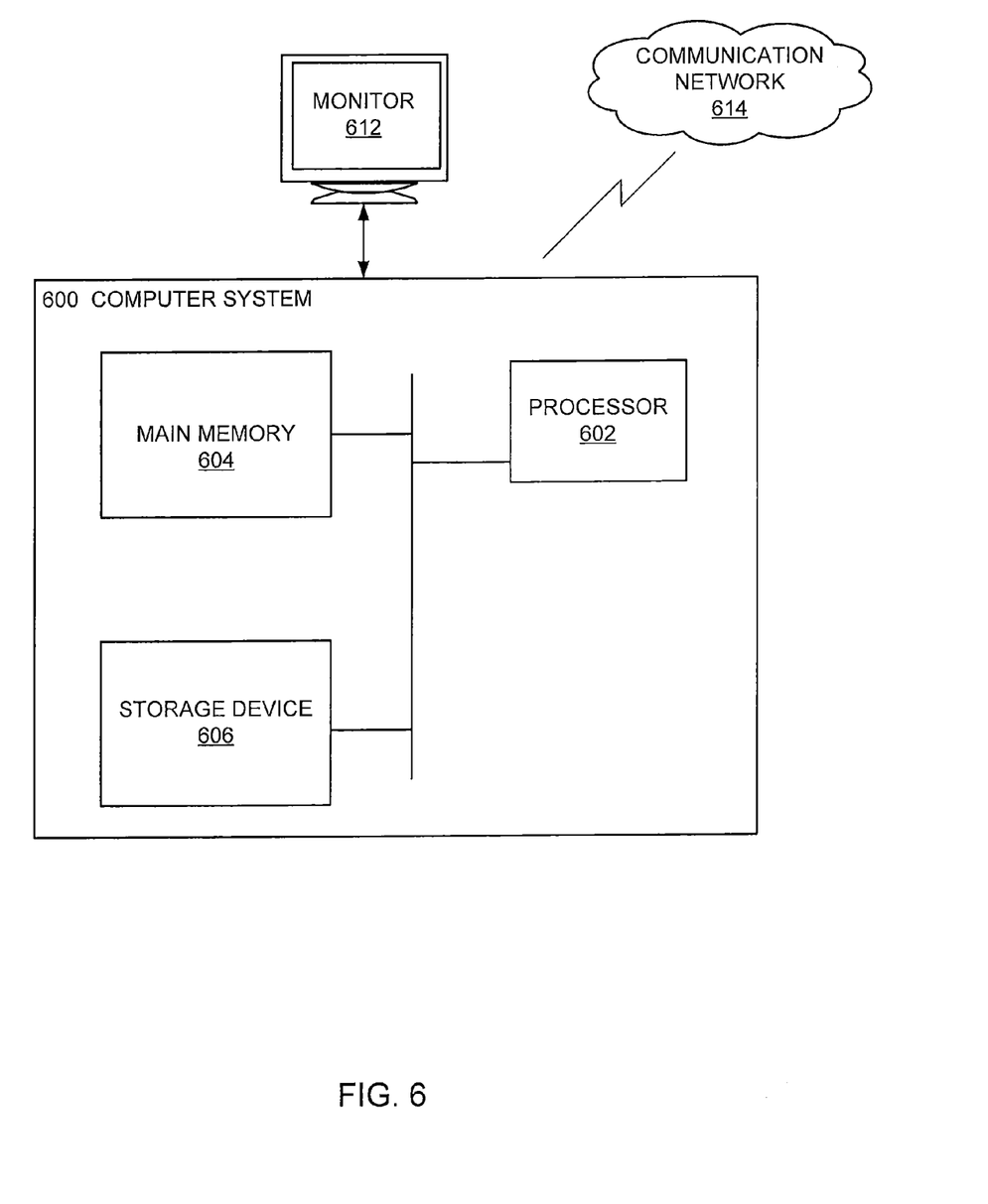
FIG. 6 is an illustration of an example computing system in accordance with one aspect of the present disclosure.

The various inventive concepts described above may be implemented on virtually any type of computer regardless of the platform being used. For example, as shown in FIG. 6, a computer system 600 includes a processor 602, associated memory 604, a storage device 606, and numerous other elements and functionalities typical of today's computers (not shown). The computer 600 may also include input means, such as a keyboard and a mouse and output means, such as a monitor 612. The computer system 600 may be connected to a local area network (LAN) or a Wide area network (e.g., the Internet), such as communication network 614, via a network interface connection (not shown). Those skilled in the art will appreciate that these input and output means may take other forms.

Further, those skilled in the art will appreciate that one or more elements of the computer system 400 may be located at a remote location and connected to the other elements over a network. The invention may be implemented on a distributed system having a plurality of nodes, where each portion of the invention (e.g., the operating system, file system, cache, application(s), etc.) may be located on a different node within the distributed system, and each node may corresponds to a computer system. Alternatively, the node may correspond to a processor with associated physical memory. The node may alternatively correspond to a processor with shared memory and/or resources. Further, software instructions to perform embodiments of the invention may be stored on a tangible computer readable medium such as a compact disk (CD), a diskette, a tape, a digital versatile disk (DVD), or any other suitable tangible computer readable storage device.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been, described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for providing raw data comprising:
    storing, for each data block of a plurality of data blocks, a raw version of the data block and a cooked version of the data block in a level-one cache of a file system;
    determining whether a first data block of the plurality of data blocks is a candidate for a level-two cache; and
    storing the raw version of the first data block into the level-two cache of the file system when the first data block is the candidate for the level-two cache.

2. The method of claim 1 further comprising removing the raw version of the first data block from the level-one cache when the first data block is the candidate for the level-two cache.

3. The method of claim 1, wherein the file system is a ZFS file system, wherein the level-one cache is an adaptive replacement cache comprising dynamic random access memory (DRAM) and wherein the raw version of the data and the cooked version of the data are stored in the DRAM.

4. The method of claim 3, wherein storing the raw version of the data block and the cooked version of the data block in the level-one cache comprises:
    updating a hash entry in a hash table corresponding to the level-one cache for the data block to include a reference to the cooked version of the data and a reference to the raw version of the data.

5. The method of claim 1, wherein the level-two cache is a persistent level-two cache comprising one or more solid-state drives and wherein the raw version of the first data block is stored in the one or more solid-state drives.

6. The method of claim 1, wherein determining whether the first data block is a candidate for the level-two cache comprises scanning an eviction list of the level-one cache for a entry corresponding to the first data block.

7. The method of claim 1, wherein the raw version of the data block is an encrypted version of the data block.

8. A system for providing raw data comprising:
    at least one processor to:
        store, for each data block of a plurality of data blocks, a raw version of the data block and a cooked version of the data block in a level-one cache of a file system;
        determine whether a first data block of the plurality of data blocks is a candidate for a level-two cache; and
        store the raw version of the first data block into the level-two cache of the file system when the first data block is the candidate for the level-two cache.

9. The system of claim 8 further comprising removing the raw version of the first data block from the level-one cache when the first data block is the candidate for the level-two cache.

10. The system of claim 8, wherein the file system is a ZFS file system, wherein the level-one cache is an adaptive replacement cache comprising dynamic random access memory (DRAM) and wherein the raw version of the data and the cooked version of the data are stored in the DRAM.

11. The system of claim 10, wherein storing the raw version of the data block and the cooked version of the data block in the level-one cache comprises:
    updating a hash entry in a hash table corresponding to the level-one cache for the data block to include a reference to the cooked version of the data and a reference to the raw version of the data.

12. The system of claim 8, wherein the level-two cache is a persistent level-two cache comprising one or more solid-state drives and wherein the raw version of the first data block is stored in the one or more solid-state drives.

13. The system of claim 8, wherein determining whether the first data block is a candidate for the level-two cache comprises scanning an eviction list of the level-one cache for a entry corresponding to the first data block.

14. The system of claim 8, wherein the raw version of the data block is an encrypted and compressed version of the data block.

15. A non-transitory computer readable medium encoded with instructions for providing raw data to a level-two cache executable by a processor, the instructions comprising:
    storing, for each data block of a plurality of data blocks, a raw version of the data block and a cooked version of the data block in a level-one cache of a file system;
    determining whether a first data block of the plurality of data blocks is a candidate for a level-two cache; and
    storing the raw version of the first data block into the level-two cache of the file system when the first data block is the candidate for the level-two cache.

16. The non-transitory computer readable medium of claim 15 further comprising removing the raw version of the first data block from the level-one cache when the first data block is the candidate for the level-two cache.

17. The non-transitory computer readable medium of claim 15, wherein the file system is a ZFS file system, wherein the level-one cache is an adaptive replacement cache comprising dynamic random access memory (DRAM) and wherein the raw version of the data and the cooked version of the data are stored in the DRAM.

18. The non-transitory computer readable medium of claim 17, wherein storing the raw version of the data block and the cooked version of the data block in the level-one cache comprises:
    updating a hash entry in a hash table corresponding to the level-one cache for the data block to include a reference to the cooked version of the data and a reference to the raw version of the data.

19. The non-transitory computer readable medium of claim 15, wherein the level-two cache is a persistent level-two cache comprising one or more solid-state drives and wherein the raw version of the first data block is stored in the one or more solid-state drives.

20. The non-transitory computer readable medium of claim 15, wherein determining whether the first data block is a candidate for the level-two cache comprises scanning an eviction list of the level-one cache for a entry corresponding to the first data block.

* * * * *

UNITED STATES PATENT AND TRADEMARK OFFICE
CERTIFICATE OF CORRECTION

| | | |
|---|---|---|
| PATENT NO. | : 8,935,481 B2 | Page 1 of 1 |
| APPLICATION NO. | : 13/656108 | |
| DATED | : January 13, 2015 | |
| INVENTOR(S) | : Maybee et al. | |

It is certified that error appears in the above-identified patent and that said Letters Patent is hereby corrected as shown below:

In the Specification

In column 1, line 18, delete "from" and insert -- form --, therefor.

Signed and Sealed this
First Day of September, 2015

Michelle K. Lee
*Director of the United States Patent and Trademark Office*